G. JAEGER

May 20, 1930. LOADER AGITATOR FOR CONCRETE MIXING MACHINES Re. 17,670

Original Filed Jan. 8, 1927

Inventor

GEBHARD JAEGER by Finnegan Finnegan his Attorneys

Reissued May 20, 1930 Re. 17,670

UNITED STATES PATENT OFFICE

GEBHARD JAEGER, OF COLUMBUS, OHIO, ASSIGNOR TO THE JAEGER MACHINE COMPANY, OF COLUMBUS, OHIO, A CORPORATION OF OHIO

LOADER AGITATOR FOR CONCRETE-MIXING MACHINES

Original No. 1,714,601, dated May 28, 1929, Serial No. 159,975, filed January 8, 1927. Application for reissue filed March 19, 1930. Serial No. 437,254.

In the type of concrete mixer in which the mixing drum is charged by means of a charging bucket that is raised on a pivot to discharge its contents of sand, gravel and cement into the drum the flow of such contents from the bucket is often so tardy as to necessitate pounding the bottom of the bucket with a hammer, heavy bar or other convenient instrument adapted to shake and hasten the material along. Such pounding indents and disfigures the bucket and aggravates the trouble. Means have heretofore been proposed and patented to automatically bodily agitate the bucket without such pounding, hence the object of the present invention is a simplified and improved means for accomplishing a similar result.

The invention is embodied in the example herein shown and described, the features of novelty being finally claimed.

In the accompanying drawing—

Figure 1:
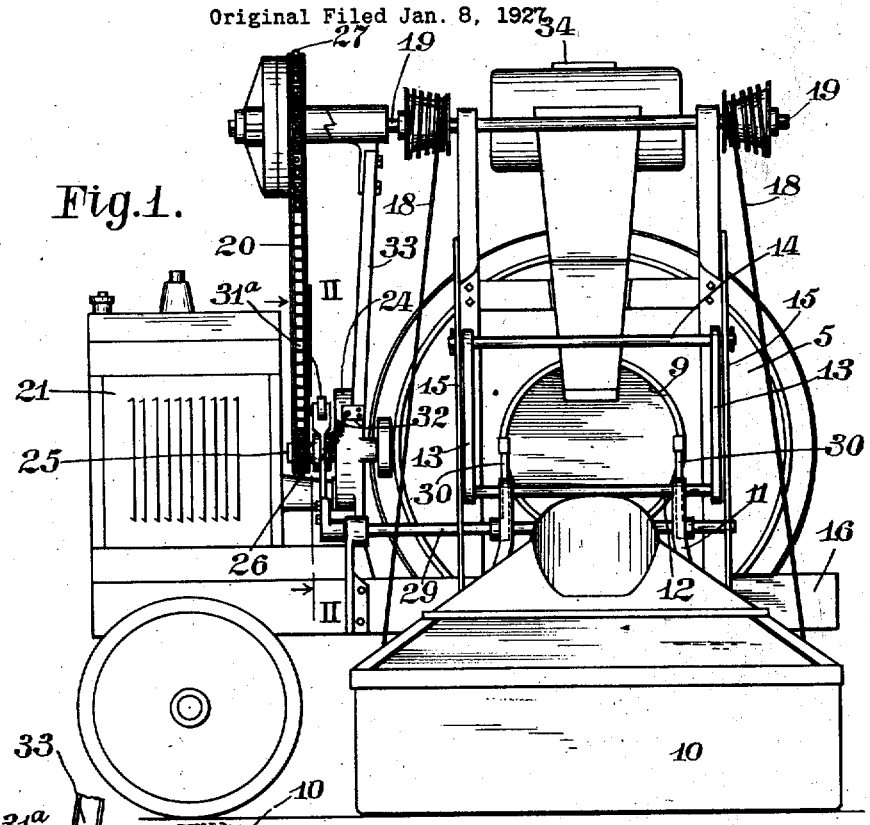
Figure 1 is a view in elevation showing my invention applied to a concrete mixing machine in which the mixing drum is of the rotating but non-tilting type, the view being taken at that side of the machine containing the charging bucket.
Figure 2:
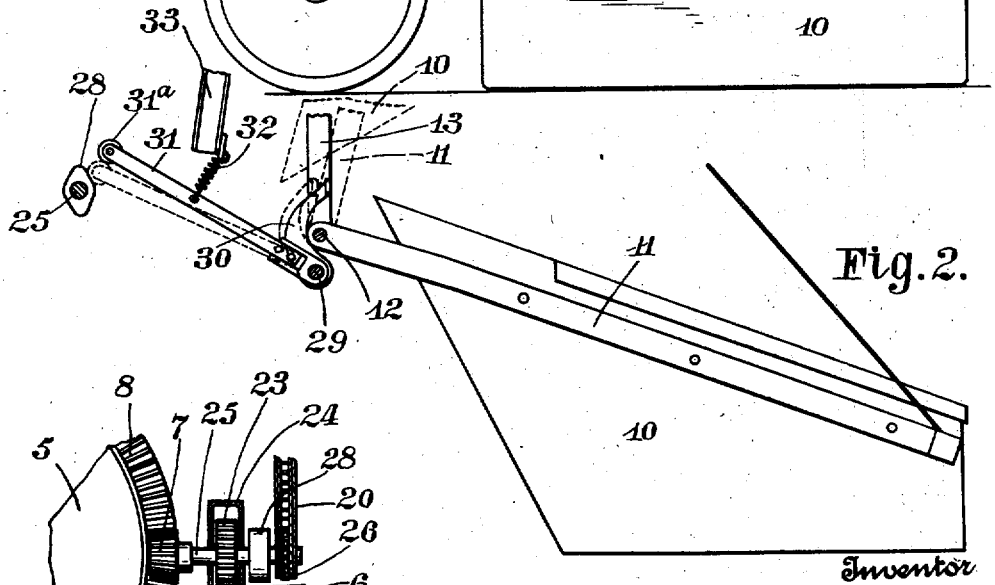
Figure 2 is a combined section and elevation on the line II—II Fig. 1 looking in the direction indicated by the arrows adjacent said line.
Figure 3:
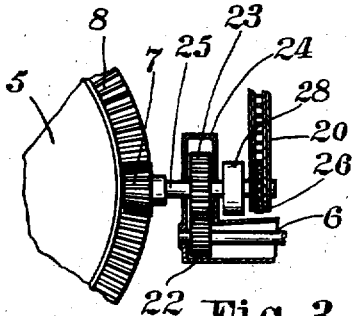
Fig. 3 is a detail in section illustrating a portion of the drum rotating means.

In the views the character 5 designates the mixing drum, it being rotated by means of a power or crank shaft 6 operating a pinion 7 meshed with an annular rack 8 on the drum. At one end the drum has a charging opening as seen at 9.

The character 10 designates the skip or charging bucket, it having side straps 11, 11 hinged at their forward ends of the lower cross bar 12 of a linking frame comprising also side bars 13, 13, and upper cross bar 14, the latter being pivoted in upright frame members 15, 15, erected on the bed 16 of a suitable truck. The bucket can be raised to position to discharge its contents into the drum through the aforesaid opening 9 by means of a pair of cables 18 winding on spools fast on a suitable shaft 19 driven by the power shaft 16 through a sprocket chain 20, suitable clutching devices and means for operating them being provided to control the times when the bucket shall be raised and lowered. Such last described mechanism, in a general way, is now in extensive use and requires no detailed description here.

The drum is rotated by means of a suitable engine housed in the hood 21, the power shaft 6 of such engine having a pinion 22 driving a larger gear 23 having shaft 25 in a housing 24, the pinion 7 on said shaft 25 engaging the annular rack 8 as before stated. On said shaft 25 is a sprocket pinion 26 extending from which to a large sprocket 27 is the sprocket chain 20 to operate the shaft 19.

The shaft 25 has secured to it a double cam 28. Journaled in the lower portions of the upright frame members 15, 15, is a rock shaft 29 secured to which are two shaker arms 30 arranged in planes including the projecting inner portions of side straps 11, 11, so that when the bucket is raised on the cross bar 12 said side straps are brought into contact with said shaker arms 30.

One end of the rock arm shaft 29 has secured to it one end of a crank arm 31, the other or free end of said arm being provided with an anti-friction roller 31[a] adapted to contact with the double cam 28 on shaft 25, when the arm is depressed. The arm 31 has connected to it a coil spring 32 attached to a fixed bar 33, said spring adapted to hold the arm 31 removed from operation by the double cam 28, and the shaker arms 30 advanced, when the bucket is down, but in position to be operated to cause contact of the roller 31[a] when the bucket approaches and is in its discharging position.

The operation is this: The engine shaft 6 and mixing drum are driven in one direction with a constant motion, the bucket hoisting and lowering mechanism being manually controlled at will as usual. The bucket is supplied with the usual solid ingredients and the drum with water from a tank having a spout as shown at 34. When the bucket is raised to position to discharge its contents into the drum the shaker arms 30 are pushed inward thereby depressing the anti-friction rollers of the crank arm into position to be actuated by the double cam which being in rapid rotation vibrates the bucket on the upper cross bar 14. Such agitation of the bucket causes the appropriate and substantially complete discharge of the contents of the bucket into the mixing drum through the opening 9 of the drum. After such a discharge the bucket is lowered and supplied with the necessary fresh charge of solids, it being noted that in the intervals between the elevated positions of the bucket the double cam turns without actuating the bucket agitating elements.

The forms of the parts can be changed without departing from the gist of the invention as claimed.

What I claim is:

1. In a concrete mixing machine having a rotatable mixing drum, a charging bucket therefor, and linking means for the bucket, means for agitating the bucket on its linking means including a crank arm and means for oscillating the same, and means whereby said crank arm is held out of oscillating position until the charging bucket is in drum charging position.

2. In a concrete mixing machine having a mixing drum, means for rotating the drum, a charging bucket for the drum, and linking means for the bucket, means for agitating the bucket on its linking means including a crank arm, means operated by the drum rotating means for oscillating said crank arm, and means whereby said crank arm is held out of oscillating position until the charging bucket is in drum charging position.

3. In a concrete mixing machine having a mixing drum, means for rotating the drum, a charging bucket for the drum and linking means for the bucket, means for agitating the bucket on its linking means including a crank arm, and a double cam operated by the drum rotating means for oscillating said crank arm, and means whereby said crank arm is held out of oscillating position until the charging bucket is in drum charging position.

4. In a concrete mixing machine having a mixing drum, means for rotating the drum, a charging bucket for the drum, and linking means for the bucket, means for agitating the bucket on its linking means including a cam operated with the drum and acting on the linking means, and means whereby said linking means are held out of actuated position pending the arrival of the bucket at drum charging position.

5. In a concrete mixing machine having a rotatable mixing drum, means for rotating the drum, a charging bucket therefor, means for holding the bucket in linked relation to the mixing drum, means for agitating the bucket when in charging position consisting of a rock shaft having an arm actuated by the bucket, a cam operated with the drum rotating means, and means whereby said arm is held from operating said cam until the drum arrives at drum charging position.

6. In a concrete mixing machine having a rotatable mixing drum, means for rotating the drum, a charging bucket therefor, means for holding the bucket in linked relation to the mixing drum, means for agitating the bucket when in charging position consisting of a rock shaft having an arm actuated by the bucket, a cam operated by the drum rotating means, and means whereby said arm is held from operating said cam until the bucket arrives at drum charging position, and means for removing said arm from said cam when the bucket retreats from drum charging position.

7. In a concrete mixer having a mixing drum and a pivoted charging skip therefor, a pendent mounting for said skip, and means for swinging said skip on its pendent mounting to facilitate the discharge of materials from said skip into said drum.

8. In a concrete mixer, a rotatable mixing drum, a pivoted charging bucket, means for pendently mounting said bucket, said bucket movable from load-receiving position to drum-charging position; and means for vibrating said bucket when in drum-charging position.

9. In a concrete mixer, a rotatable mixing drum, a drum charging bucket, a pendent link mounting for the bucket, means pivoting the bucket to swing on said link mounting; and means operated with the drum for vibrating the bucket in its drum charging position.

10. In a concrete mixer, a rotatable mixing drum; a skip, means for raising the skip from loading to drum charging position, means for suspending said skip in drum charging position to permit vibration thereof, and means for automatically vibrating said skip in its suspended and charging position to facilitate the discharge of the skip into the drum.

GEBHARD JAEGER.